(12) United States Patent
Chawre et al.

(10) Patent No.: US 10,873,851 B2
(45) Date of Patent: Dec. 22, 2020

(54) METHOD AND SYSTEM FOR SCALABLE DOWNLINK DATA LOAD DISTRIBUTION BETWEEN DATA PROCESSING UNITS FOR MOBILE PACKET DATA GATEWAY USING NETWORK ADDRESS TRANSLATION

(71) Applicant: MAVENIR SYSTEMS, INC., Richardson, TX (US)

(72) Inventors: Amit Chawre, Dombivali East Thane (IN); Himanshu Rakshit, West Bengal (IN)

(73) Assignee: Mavenir Systems, Inc., Richardson, TX (US)

( * ) Notice: Subject to any disclaimer, the term of this patent is extended or adjusted under 35 U.S.C. 154(b) by 0 days.

(21) Appl. No.: 16/494,170

(22) PCT Filed: Jan. 5, 2018

(86) PCT No.: PCT/US2018/012482
§ 371 (c)(1),
(2) Date: Sep. 13, 2019

(87) PCT Pub. No.: WO2018/129250
PCT Pub. Date: Jul. 12, 2018

(65) Prior Publication Data
US 2020/0092714 A1    Mar. 19, 2020

(30) Foreign Application Priority Data
Jan. 9, 2017   (IN) .............................. 201741000778

(51) Int. Cl.
*H04W 8/26* (2009.01)
*H04L 29/12* (2006.01)
*H04W 88/16* (2009.01)

(52) U.S. Cl.
CPC ........... *H04W 8/26* (2013.01); *H04L 61/2007* (2013.01); *H04L 61/2061* (2013.01); *H04L 61/2514* (2013.01); *H04W 88/16* (2013.01)

(58) Field of Classification Search
CPC ............. H04L 61/2061; H04L 12/2856; H04L 29/12009; H04L 29/12283; H04W 8/26
See application file for complete search history.

(56) References Cited

U.S. PATENT DOCUMENTS 6,778,528 B1 *   8/2004   Blair ................... H04L 12/2856
                                                        370/352
2012/0082110 A1   4/2012   Su et al.
(Continued)

OTHER PUBLICATIONS

International Search Report and Written Opinion for corresponding international application PCT/US18/12482, 9 pages, dated Mar. 29, 2018.

*Primary Examiner* — Chandrahas B Patel
(74) *Attorney, Agent, or Firm* — Ohlandt, Greeley, Ruggiero & Perle, LLP

(57) ABSTRACT

Each UE in a mobile data network is assigned two different addresses, one a common IP address used downstream of the P-GW and the other a new IP address used upstream with the router and unique to the data processing node. The node changes the IP address of the UE in either direction as a packet passes through the P-GW. The use of an IP range unique to each node or data processing unit allows the upstream router to route downlink packets directly to the node containing the UE context, so that forwarding of packets between nodes is greatly reduced, if not eliminated. By getting rid of this inter-node forwarding, the data plane can scale to much greater limits.

20 Claims, 4 Drawing Sheets

(56) References Cited

U.S. PATENT DOCUMENTS

| | | |
|---|---|---|
| 2012/0246325 A1 | 9/2012 | Pancorbo Marcos et al. |
| 2014/0280737 A1 | 9/2014 | Bicket et al. |
| 2014/0307629 A1 | 10/2014 | Liebsch |
| 2016/0057788 A1 | 2/2016 | Sharma et al. |

* cited by examiner

METHOD AND SYSTEM FOR SCALABLE DOWNLINK DATA LOAD DISTRIBUTION BETWEEN DATA PROCESSING UNITS FOR MOBILE PACKET DATA GATEWAY USING NETWORK ADDRESS TRANSLATION

BACKGROUND OF THE INVENTION

1. Field of the Invention

The invention relates to the mobile data network in general. In particular, this disclosure relates to general packet radio service (GPRS) networks and their evolution, including, but not limited to, Universal Mobile Telecommunication Systems (UMTS), Long Term Evolution (LTE) systems and Fifth Generation Core (5GC) systems.

2. Description of the Related Art

The mobile packet data networks comprise packet data gateways (UPF, P-GW and GGSN) which act as edge routers and are responsible for tunneling and de-tunneling of user equipment (UE) downlink and uplink data, respectively. The packet data gateways have multiple packet processing nodes distributed over different blade servers. The UE data sessions, which are in order of >500 k, are distributed randomly across these nodes of packet data gateways. As the upstream router is not aware of this distribution across the blades (or server modules), it cannot forward a packet to the particular node hosting the particular UE session. In legacy systems, all the nodes of packet data gateway advertise to the upstream router with the route(s) for UE IP address ranges/subnets which they may handle. The upstream router distributes UE downlink packets on one of the routes to a node. Given that each of the nodes is then advertising the same IP address ranges/subnets, there are a myriad of apparently available routes for a packet to a node. In such case, if the node receiving a packet does not have the session for the UE, the node checks if the UE session exists on another node and routes the packet to that node.

This system requires high-speed internal network connectivity between the nodes to transport the packets to the correct nodes. Further, the node needs to spend a significant amount of CPU time finding out the exact node containing the UE session and forwarding the packet to that node. In a cloud-based environment where each processing node is a virtual machine, the requirement of high-speed inter-connectivity between the virtual machines is highly undesirable. This random routing of packets also limits the ability to scale the network, since the probability of a downlink UE packet reaching the right node decreases proportionally with the number of data processing nodes and the system tends to spend more time forwarding the packets internally rather than processing packets for UE sessions. The impact is even higher in case the nodes are scaled across different physical blades/chassis/datacenters.

FIG. 1A illustrates the problem in detail. A packet data gateway 100 comprises two Packet Data Processing units, namely data processing unit 1 102 and data processing unit 2 104. Let us suppose that there are user 1 106 and user 2 108. Now when user 1 106 is being attached to the network, it gets the IP address 192.168.10.2 and is being served by the data processing unit 1 102. Now when any downlink data comes for user 1 106 from the packet data network 110, the upstream router 112 routes this packet to the data processing unit 1 102. Moreover, since the data processing unit 1 102 has the session for that particular user, it processes the data packet and forwards it to the eNB 114. The eNB 114 then forwards the packet to user 1 106.

Now user 2 108 is attached and gets the IP address 192.168.10.3. Since the distribution of the IP pool is random, let us suppose that user 2 108 is being served by the data processing unit 2 104. Now when a downlink data packet comes for user 2 108 from the packet data network 110 the upstream router 112 may send this packet to the data processing unit 1 102 as the upstream router 112 has no knowledge about the distribution of the IP addresses between the data processing units. In this case, as data processing unit 1 102 does not have the context for user 2 108, it cannot process the packet. To process the packet, data processing unit 1 102 first needs to find out which data processing node is serving this particular user and then needs to send the entire packet to that particular node. So in this case data processing unit 1 102 needs to spend its CPU time on a packet which is not being processed by it, which will cause a significant decrease in throughput. The case will be even higher in case of a higher number of data processing units. To send the packet to the proper data processing unit, there has to be a mesh topology amongst the data processing units and high fiber link connectivity between them, as illustrated by switch 116. In case of a cloud-based environment illustrated in FIG. 1B, data processing units may be virtual machines, such as VM 1 102' and VM 2 104', residing on the same server, in which case the packets must be transferred through a virtual switch 116', or on separate physical servers, in which case two virtual switches, two network cards and a physical switch are in the transfer path. In either case, high-speed connectivity between them may not be feasible. Hence, this will cap the infinite scaling of data processing units, limiting the expected throughput.

BRIEF SUMMARY OF THE INVENTION

Embodiments according to the present invention can be used for seamless horizontal scalability of the data plane across blades/chassis in pure cloud/virtualized environments without needing high speed interconnects. Each UE is assigned two different addresses, one a common IP address used downstream of the P-GW and the other a new IP address used upstream with the router and unique to the data processing node. The node changes the IP address of the UE in either direction as a packet passes through the P-GW. The use of an IP range unique to each node or data processing unit allows the upstream router to route directly to the node containing the UE context, so that forwarding between nodes is greatly reduced, if not eliminated. By getting rid of this inter-node forwarding, the data plane can scale to much greater limits. In the context of a Fifth Generation (5G) mobile network, each node may be a User Plane Function (UPF) node.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE INVENTION

Figure 1A:
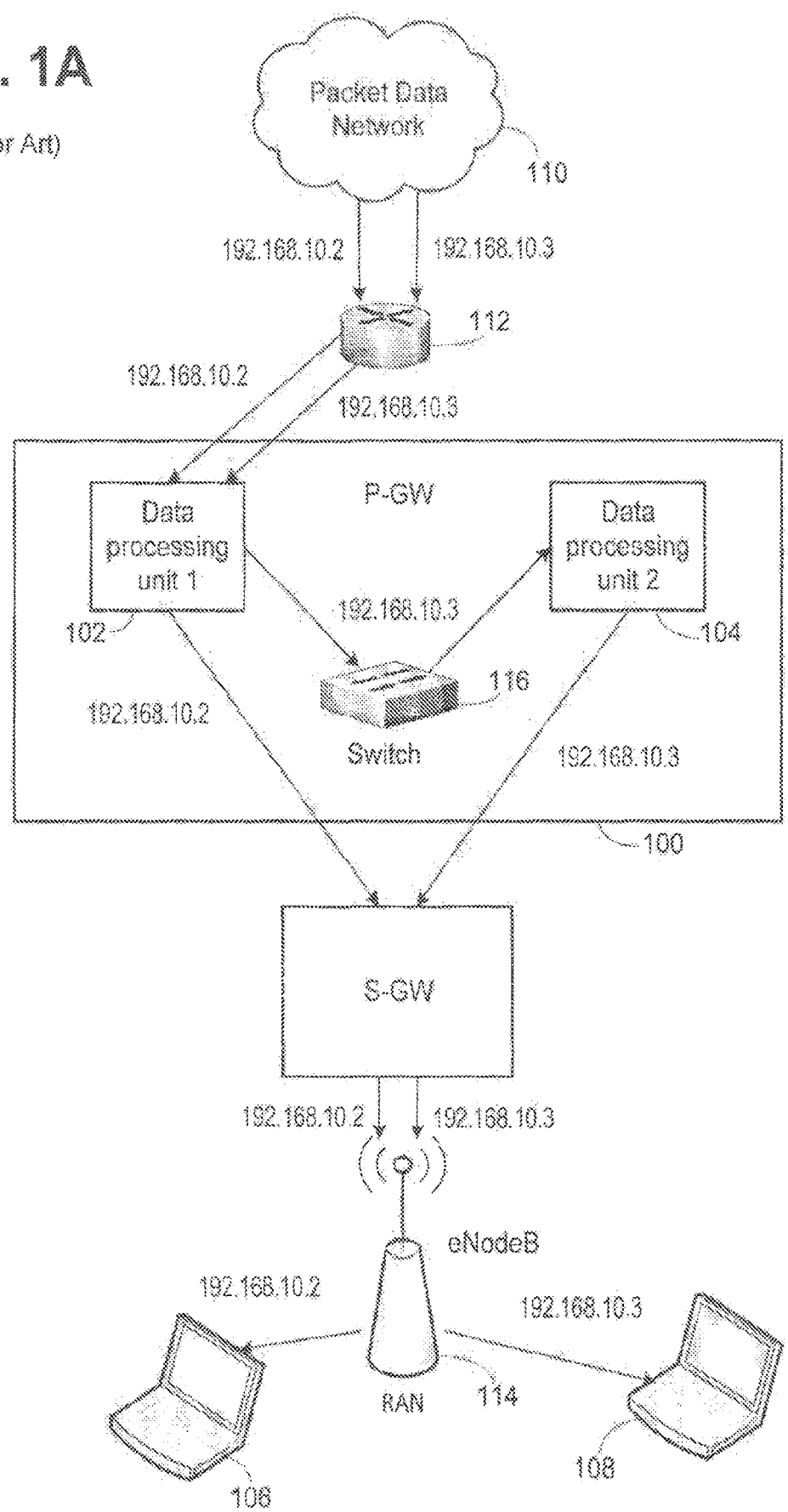
FIG. 1A is a block diagram of a cellular network according to the prior art.

Conventionally purpose-built packet core gateways have multiple packet processing blades. The total throughput support required at gateways (>100 Gbps) is much higher than throughput of a network interface (NIC) card (10 Gbps) on packet processing blades. To achieve the throughput >100 Gbps, multiple NICs cards on a blade are used. Even with multiple NIC cards on a blade, there is an upper limit on the number of user contexts that can be processed on a blade. Packet processing is distributed across the nodes on the multiple blades. Given a fixed IP pool for users, distribution of IP addresses on the blades can be random. Due to this, packets can arrive on blades that do not have contexts of the user session for processing. Since the number of users can be huge (millions), the upstream router also cannot keep a forwarding information base (FIB) for all the users. To overcome this, the blades receiving a downlink packet forward the packets to the correct blade where the user context resides. The routing between the blades is done using switch fabrics, which provide mesh interconnects between every blades and throughput in access of 400 Gbps. This way the interconnect does not become a throughput bottleneck. In a cloud environment, assuming a VM does the equivalent of packet processing blade, there is no equivalent of a mesh interconnect or switch fabric when the VMs reside on different physical chassis. Even when operating on the same chassis, interconnection is through a virtual switch, which is many times slower than a physical switch. Thus, forwarding packets between the VMs for processing can result in a bottleneck and aggregate throughput will be not scale with addition of more VMs for packet processing. Instead of forwarding the packets internally, embodiments according to the present invention use a method that enables distribution of the downlink packets directly from an upstream router to the node that is handling the packet processing for the UE session.

Each mobile packet data node has a mutually exclusive set of IPv4/IPv6 address pool(s), which may or may not contain IP addresses equal to the maximum number of sessions supported by the node. This is referred to as the local Care-of-Address (CoA) IP pool. Each Mobile Packet Data node advertises routes for its CoA IP address pool(s) to the upstream router using any of the supported routing protocols. When a UE session is established, the UE is assigned a set of two IP addresses. One IP address (IPv4/IPv6) is from the IP pool for the access point name (APN), while the other is from the node local Care-of-Address IP pool. While the UE is conveyed the IP address from the IP pool for the APN, the CoA IP address is saved in the UE session. When an uplink packet is received at the node, the node replaces the source (UE) IP address with the CoA IP address from the UE Session and the packet is sent to upstream router and then to the packet data network. When a downlink packet is received at the upstream router, the destination is of the node local Care-of-Address IP address. This enables the upstream router to route the packet directly to the node having the UE session, thereby reducing forwarding. As an example, the IP address pools for APN and CoA may be stored in the core network packet data gateway, although this example is not to be construed as limiting.

In case the CoA IP address pool(s) size is less than the maximum number of sessions supported by the node, simple network address translation (NAT) can be employed to achieve the same result as described here. When the UE session is established, the UE address is assigned an IP address from the APN pool of IP addresses. The IP address assigned to the UE is NATed against the CoA IP pool subnet. When an uplink packet is received at the node, the node NATs the packet with a CoA IP using a many-to-many NAT function. The packet is sent to the upstream router and to the packet data network. When a packet is received at downlink with the CoA NAT IP, the DNAT function translates it to the UE IP address. The user session is identified by the UE IP, and the packet is forwarded downlink to the UE. The upstream router is configured with routes of the CoA IP ranges to respective packet data gateways. The downlink packet, in this manner, is always directed to the correct node, thereby eliminating any data forwarding between gateways.

Figure 2A:
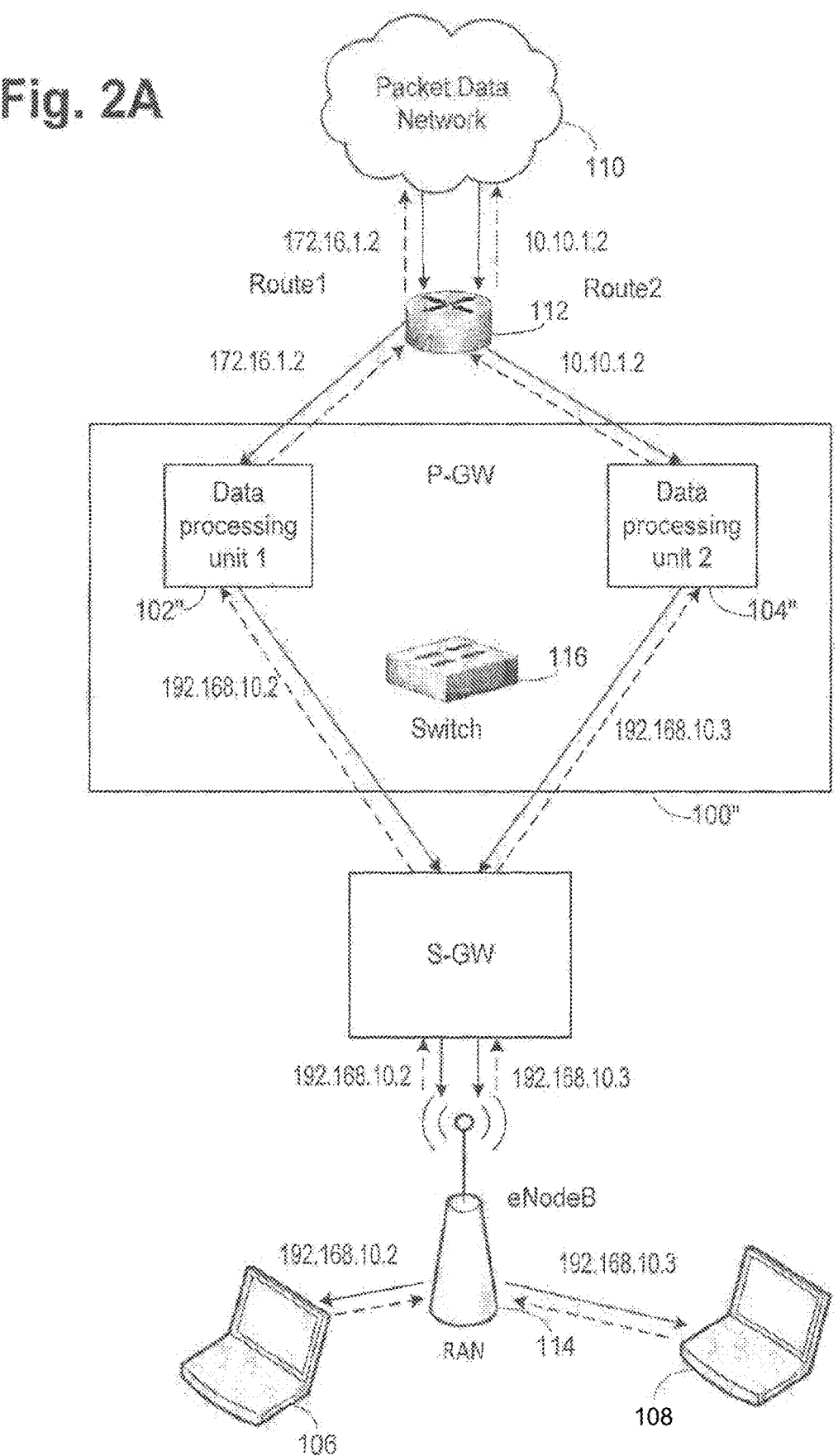
FIG. 2A is a block diagram of a cellular network according to the present invention.

FIG. 2A illustrates operation of the CoA IP address. Again the packet data gateway comprises two Packet Processing Units—data processing unit 1 102" and data processing unit 2 104". Supposing Data processing unit 1 102" has a care-of-address (CoA) IP address pool of 172.16.1.0/24 and data processing unit 2 104" has a CoA IP address pool of 10.10.1.0/24. Static routes are configured in upstream router 112, routing 172.16.1.0/24 to data processing unit 1 102" (ROUTE1 corresponding to the left-side route in FIG. 2A) and 10.10.1.0/24 to data processing unit 2 104" (ROUTE2 corresponding to the right-side route in FIG. 2A).

Now, let user 1 106 get attached with the gateway 100" and the user gets the IP address 192.168.10.2 and it is being served by data processing unit 1 102". For uplink packets (with source IP address of 192.168.10.2) for user 1 106, a NAT function can be used to change the source IP address of the packet to a CoA IP address, say 172.16.1.2, before sending it out to the PDN 110 through the upstream router 112. For any downlink data that comes from the packet data network no for this user, the upstream router 112 routes the packet to the data processing unit 1 102" using ROUTE1. After receiving the packet, data processing unit 1 102" can apply a reverse NAT function to change the destination IP address back to 192.168.10.2 before sending it to user 1 106.

Now assume another user, user 2 108 is attached with the packet data gateway 100" and it gets the IP address 192.168.10.3. For uplink packets for this user, the NAT function will change the source IP address to, for example, 10.10.1.2 before sending the packet to the PDN gateway no. For downlink packets, the destination IP address is 10.10.1.2 and the upstream router 112 sends the packet directly to the data processing unit 2 104" following ROUTE2. At the Processing Unit 2 104", the reverse NAT function changes the destination IP address back to 192.168.10.3 and the packet is sent to user 2 108.

In this case, only one route for each of the data processing unit needs to be installed at the upstream router. For every downlink packet the upstream router will send the packet to the correct data processing unit which has the session for the user. Inter-data processing unit forwarding of data would not be needed in this case as packets will always land on the correct nodes. No high speed inter connectivity between the nodes is needed.

Figure 1B:
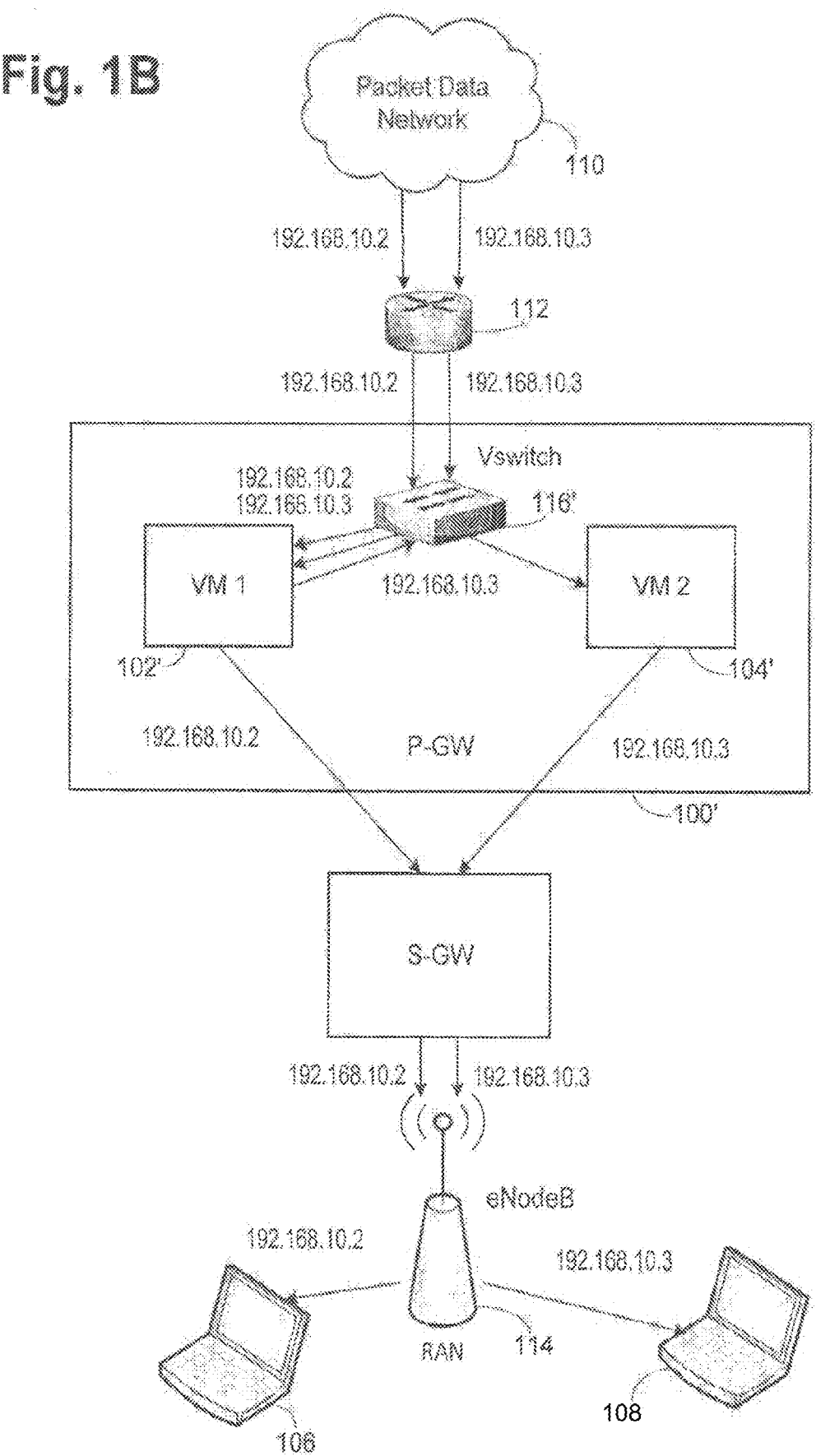
FIG. 1B is a block diagram of the cellular network of FIG. 1A where VMs are being used.
Figure 2B:
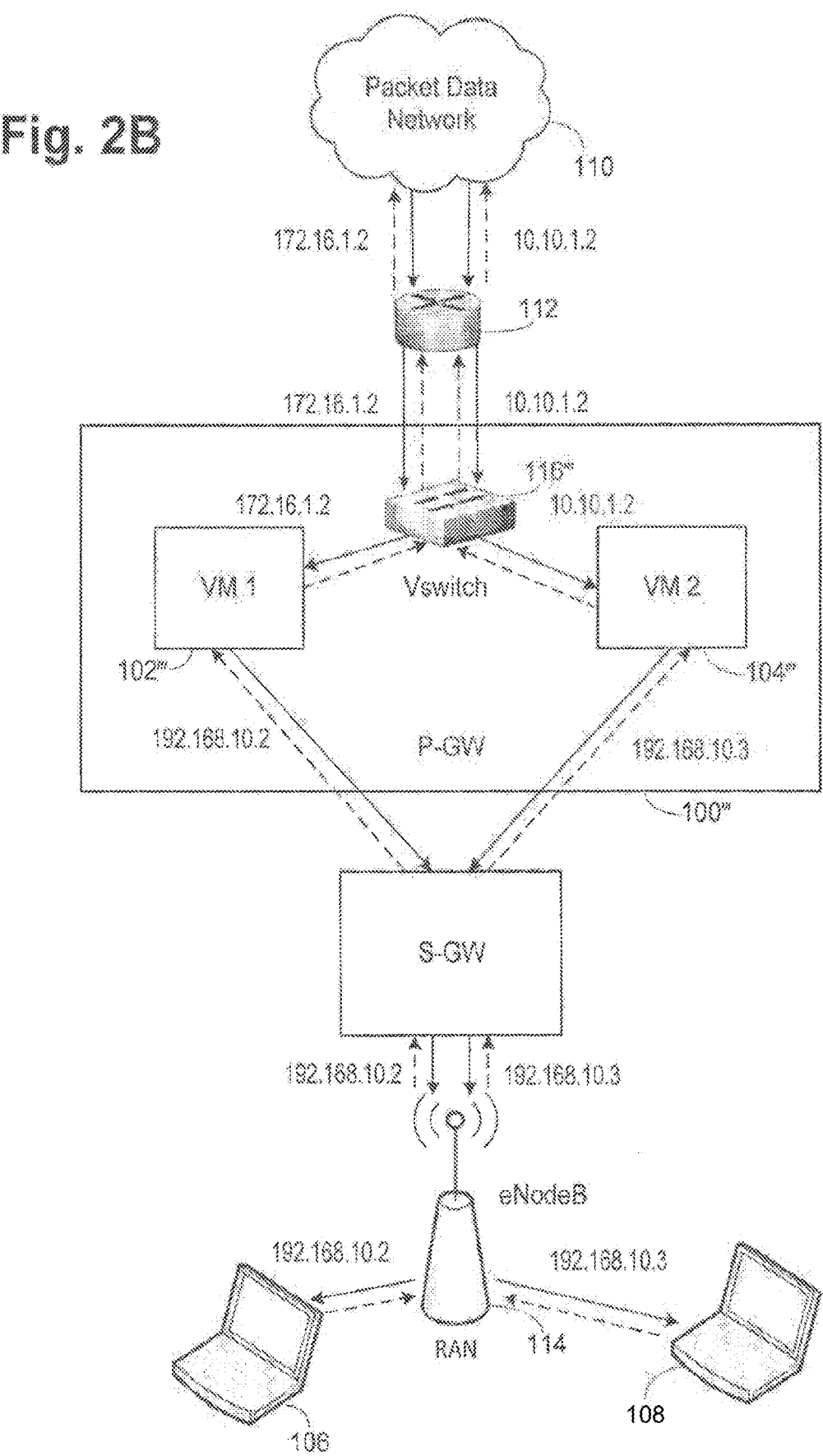
FIG. 2B is a block diagram of the cellular network of FIG. 2A where VMs are being used.

This solution is best suited for the cloud-based solution, where each data processing unit is virtual machine and they may reside in same or different server. This is shown in FIG. 2B, which compares to FIG. 1B, with "''" being used for the changed elements. This solution will allow unlimited scaling for a virtualized data plane solution. For example, in the context of a Fifth Generation (5G) mobile network, each node may be a User Plane Function (UPF) node.

While examples have used IPv4 addresses as examples, it is understood that the IP addresses can be either IPv4 or IPv6 addresses.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for operation of a mobile core network packet data gateway, comprising:
    maintaining a first pool of IP addresses for use by a user equipment;
    maintaining a second pool of IP addresses for use by a packet data network, the second pool of IP addresses being further subdivided into subpools of IP addresses, each subpool of IP addresses being allocated to a different data processing node in the packet data gateway;
    in response to receiving a connection request from a user equipment, assigning an IP address from the first pool of IP addresses to the user equipment, determining a data processing node for managing a connection with the user equipment and assigning an IP address from the subpool of IP addresses allocated to the determined data processing node to the user equipment; and
    performing at least one of:
        (a) an uplink packet transfer comprising:
            receiving, from the user equipment, a packet directed to a packet data network; and
            in response to receiving the packet from the user equipment, changing the source IP address of the packet from the assigned first pool IP address to the assigned subpool IP address; and
        (b) a downlink packet transfer comprising:
            receiving, from the packet data network, a packet directed to the user equipment; and
            in response to receiving the packet from the packet data network, changing the destination IP address of the packet from the assigned subpool IP address to the assigned first pool IP address.

2. The method of claim 1, further comprising:
    configuring a router coupled upstream to the packet data gateway to route the packet received from the packet data network to the data processing node associated with the subpool of IP addresses allocated to the data processing node.

3. The method of claim 2, wherein the data processing node is a User Plane Function (UPF) node.

4. The method of claim 2, wherein at least one of:
    (a) in response to receiving the packet from the user equipment, the source IP address of the packet is changed from the assigned first pool IP address to the assigned subpool IP address by using a network address translation; and
    (b) in response to receiving the packet from the packet data network, the destination IP address of the packet is changed from the assigned subpool IP address to the assigned first pool IP address by using a reverse network address translation.

5. The method of claim 2, wherein the data processing node is a virtual machine.

6. The method of claim 1, wherein the data processing node is a virtual machine.

7. The method of claim 6, wherein at least one of:
    (a) in response to receiving the packet from the user equipment, the source IP address of the packet is changed from the assigned first pool IP address to the assigned subpool IP address by using a network address translation; and
    (b) in response to receiving the packet from the packet data network, the destination IP address of the packet is changed from the assigned subpool IP address to the assigned first pool IP address by using a reverse network address translation.

8. The method of claim 1, wherein at least one of:
    (a) in response to receiving the packet from the user equipment, the source IP address of the packet is changed from the assigned first pool IP address to the assigned subpool IP address by using a network address translation; and
    (b) in response to receiving the packet from the packet data network, the destination IP address of the packet is changed from the assigned subpool IP address to the assigned first pool IP address by using a reverse network address translation.

9. The method of claim 1, wherein the data processing node is a User Plane Function (UPF) node.

10. The method of claim 9, wherein at least one of:
    (a) in response to receiving the packet from the user equipment, the source IP address of the packet is changed from the assigned first pool IP address to the assigned subpool IP address by using a network address translation; and
    (b) in response to receiving the packet from the packet data network, the destination IP address of the packet is changed from the assigned subpool IP address to the assigned first pool IP address by using a reverse network address translation.

11. A mobile core network packet data gateway, comprising:
    a plurality of data processing nodes for managing a connection with a user equipment and a connection with a packet data network;
    wherein:
        a first pool of IP addresses is maintained for use by the user equipment, and a second pool of IP addresses is maintained for use by the packet data network, the second pool of IP addresses being further subdivided into subpools of IP addresses, each data processing node in the packet data gateway being configured to be allocated to a different subpool of IP addresses;
        in response to receiving a connection request from the user equipment, an IP address is assigned from the first pool of IP addresses to the user equipment, a data processing node for managing a connection with the user equipment is determined, and an IP address from the subpool of IP addresses allocated to the determined data processing node is assigned to the user equipment; and
        at least one of:
            (a) in response to receiving a packet from the user equipment directed to the packet data network, changing the source IP address of the packet from the assigned first pool IP address to the assigned subpool IP address; and (b) in response to receiving a packet from the packet data network directed to the user equipment, changing the destination IP address of the packet from the assigned subpool IP address to the assigned first pool IP address.

12. The mobile core network packet data gateway of claim 11, further comprising:

a router coupled upstream to the packet data gateway and configured to route the packet received from the packet data network to the data processing node associated with the subpool of IP addresses allocated to the data processing node.

13. The mobile core network packet data gateway of claim 12, wherein the data processing node is a User Plane Function (UPF) node.

14. The mobile core network packet data gateway of claim 12, wherein at least one of:

(a) in response to receiving the packet from the user equipment, the source IP address of the packet is changed from the assigned first pool IP address to the assigned subpool IP address by using a network address translation; and (b) in response to receiving the packet from the packet data network, the destination IP address of the packet is changed from the assigned subpool IP address to the assigned first pool IP address by using a reverse network address translation.

15. The mobile core network packet data gateway of claim 12, wherein the data processing node is a virtual machine.

16. The mobile core network packet data gateway of claim 11, wherein the data processing node is a virtual machine.

17. The mobile core network packet data gateway of claim 16, wherein at least one of:

(a) in response to receiving the packet from the user equipment, the source IP address of the packet is changed from the assigned first pool IP address to the assigned subpool IP address by using a network address translation; and (b) in response to receiving the packet from the packet data network, the destination IP address of the packet is changed from the assigned subpool IP address to the assigned first pool IP address by using a reverse network address translation.

18. The mobile core network packet data gateway of claim 11, wherein at least one of:

(a) in response to receiving the packet from the user equipment, the source IP address of the packet is changed from the assigned first pool IP address to the assigned subpool IP address by using a network address translation; and (b) in response to receiving the packet from the packet data network, the destination IP address of the packet is changed from the assigned subpool IP address to the assigned first pool IP address by using a reverse network address translation.

19. The mobile core network packet data gateway of claim 11, wherein the data processing node is a User Plane Function (UPF) node.

20. The mobile core network packet data gateway of claim 19, wherein at least one of:

(a) in response to receiving the packet from the user equipment, the source IP address of the packet is changed from the assigned first pool IP address to the assigned subpool IP address by using a network address translation; and (b) in response to receiving the packet from the packet data network, the destination IP address of the packet is changed from the assigned subpool IP address to the assigned first pool IP address by using a reverse network address translation.

\* \* \* \* \*